United States Patent
Vignali et al.

(10) Patent No.: US 9,631,496 B2
(45) Date of Patent: Apr. 25, 2017

(54) FAN ROTOR WITH THICKENED BLADE ROOT

(71) Applicant: Hamilton Sundstrand Corporation, Windsor Locks, CT (US)

(72) Inventors: Mark Vignali, Northfield, CT (US); Harold W. Hipsky, Willington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 573 days.

(21) Appl. No.: 14/192,996

(22) Filed: Feb. 28, 2014

(65) Prior Publication Data

US 2015/0247408 A1   Sep. 3, 2015

(51) Int. Cl.
*F01D 5/14* (2006.01)
*F01D 5/34* (2006.01)

(52) U.S. Cl.
CPC ............... *F01D 5/141* (2013.01); *F01D 5/34* (2013.01); *F05D 2220/36* (2013.01); *F05D 2250/74* (2013.01); *Y02T 50/673* (2013.01)

(58) Field of Classification Search
CPC ... F01D 5/14; F01D 5/141; F01D 5/34; F05D 2220/36; F05D 2250/74
See application file for complete search history.

(56) References Cited

U.S. PATENT DOCUMENTS

| 3,178,099 | A | * | 4/1965 | Child | F04D 19/002 |
| | | | | | 415/119 |
| 6,328,533 | B1 | | 12/2001 | Decker et al. | |
| 6,761,539 | B2 | | 7/2004 | Cipelletti et al. | |
| 7,476,086 | B2 | | 1/2009 | Wadia et al. | |
| 7,946,825 | B2 | | 5/2011 | Tudor | |
| 8,075,274 | B2 | | 12/2011 | Carvalho | |
| 8,083,487 | B2 | | 12/2011 | Wood et al. | |
| 8,419,372 | B2 | | 4/2013 | Wood et al. | |
| 8,419,374 | B2 | | 4/2013 | Huth et al. | |
| 8,523,530 | B2 | | 9/2013 | Merritt et al. | |
| 8,529,210 | B2 | | 9/2013 | Merritt et al. | |

* cited by examiner

*Primary Examiner* — Craig Kim
*Assistant Examiner* — Danielle M Christensen
(74) *Attorney, Agent, or Firm* — Kinney & Lange, P.A.

(57) ABSTRACT

A fan rotor of an air cycle machine includes a hub with fan blades extending from the hub. Each of the plurality of fan blades includes a main airfoil portion located distally from the hub. The main airfoil portion generally has a uniform thickness along its span. A base portion located between the hub and the main airfoil portion of each of the fan blades has a chord length that is longer than a chord length of the main airfoil portion.

12 Claims, 5 Drawing Sheets

FAN ROTOR WITH THICKENED BLADE ROOT

BACKGROUND

The present invention relates to Air Cycle Machines (ACMs), and more particularly to a fan rotor of an ACM.

ACMs may be used to provide temperature controlled air to various components of an aircraft. From within the ACM, a compressor discharges compressed air that flows through a downstream heat exchanger and then is routed to a turbine. The turbine extracts energy from the air as it expands to drive the compressor. The air output from the turbine may be utilized as an air supply for a vehicle, such as the cabin of an aircraft. ACMs may be used to achieve a desired pressure, temperature, and humidity in the air that is transferred to the environmental control system of the aircraft.

ACMs often have a three-wheel or four-wheel configuration. In a three-wheel ACM, a turbine drives both a compressor and a fan which rotate on a common shaft. In a four-wheel ACM, two turbine sections drive a compressor and a fan on a common shaft.

SUMMARY

A fan rotor of an air cycle machine includes a hub with fan blades extending from the hub. Each of the plurality of fan blades includes a main airfoil portion located distally from the hub. The main airfoil portion generally has a uniform thickness along its span. A base portion located between the hub and the main airfoil portion of each of the fan blades has a chord length that is longer than a chord length of the main airfoil portion.

A fan rotor of an air cycle machine includes a hub with fan blades extending from the hub. Each of the fan blades is defined by a set of X-coordinates, Y-coordinates, and Z-coordinates scaled by a desired factor, as set out in any of Table B-1 or Table B-2. The X-coordinates being in the axial direction of the air cycle machine, the Y-coordinates being in the radial direction of the air cycle machine, and the Z-coordinates being in a tangential direction.

DETAILED DESCRIPTION

Figure 1:
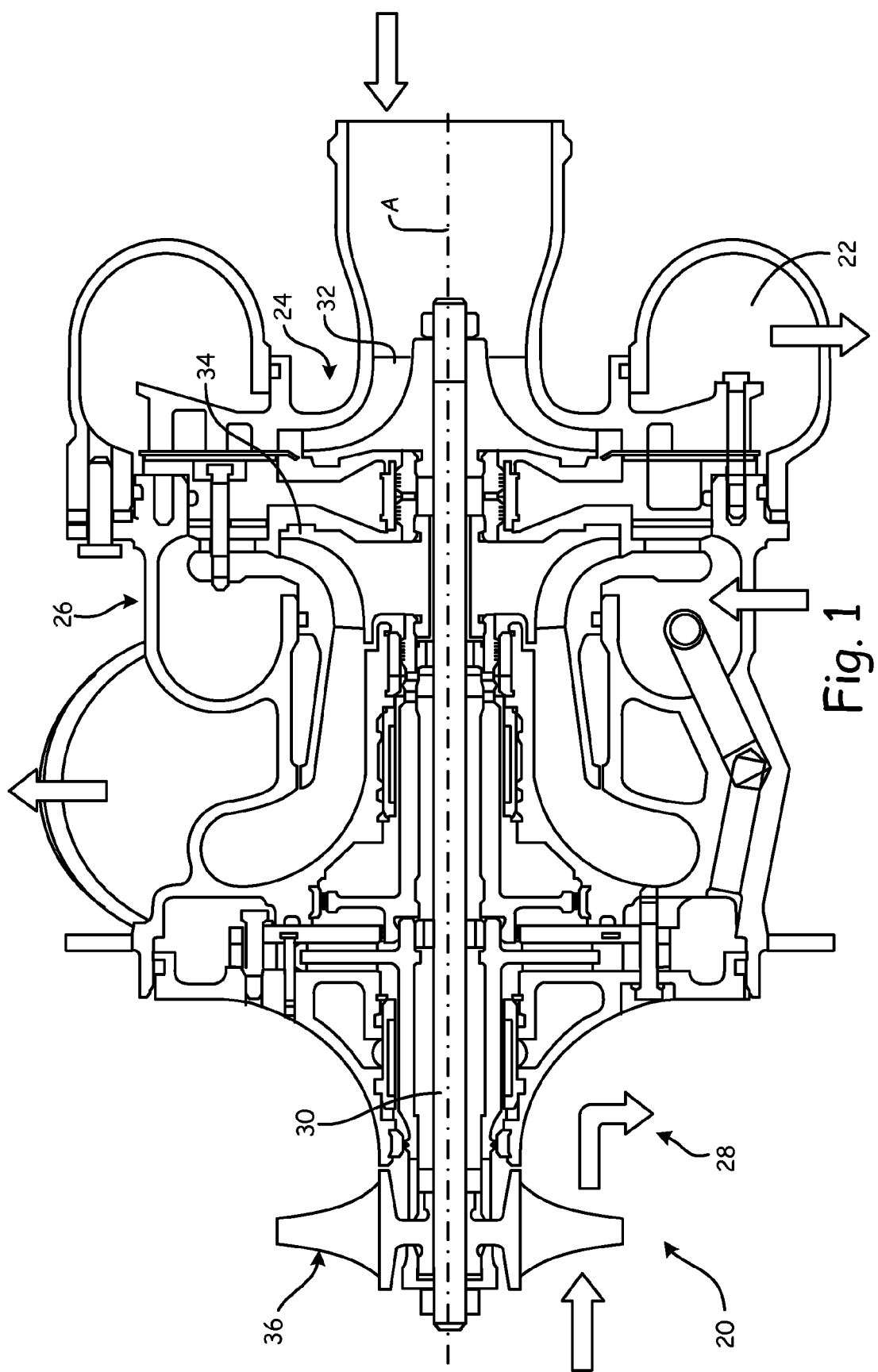
FIG. 1 is a cross-sectional view of an air cycle machine.

FIG. 1 is a cross-sectional view of air cycle machine 20 ("ACM") that is incorporated into air supply system 22 of a vehicle, such as an aircraft, helicopter, or land-based vehicle. ACM 20 includes compressor section 24, turbine section 26 and fan section 28 that are generally disposed about main shaft 30, such as a tie rod. Compressor section 24 includes compressor rotor 32, turbine section 26 includes turbine rotor 34, and fan section 28 includes fan rotor 36. Compressor rotor 32, turbine rotor 34, and fan rotor 36 are secured on main shaft 30 for co-rotation about axis A. Fan section 28 is located axially upstream from turbine section 26.

Figure 2:
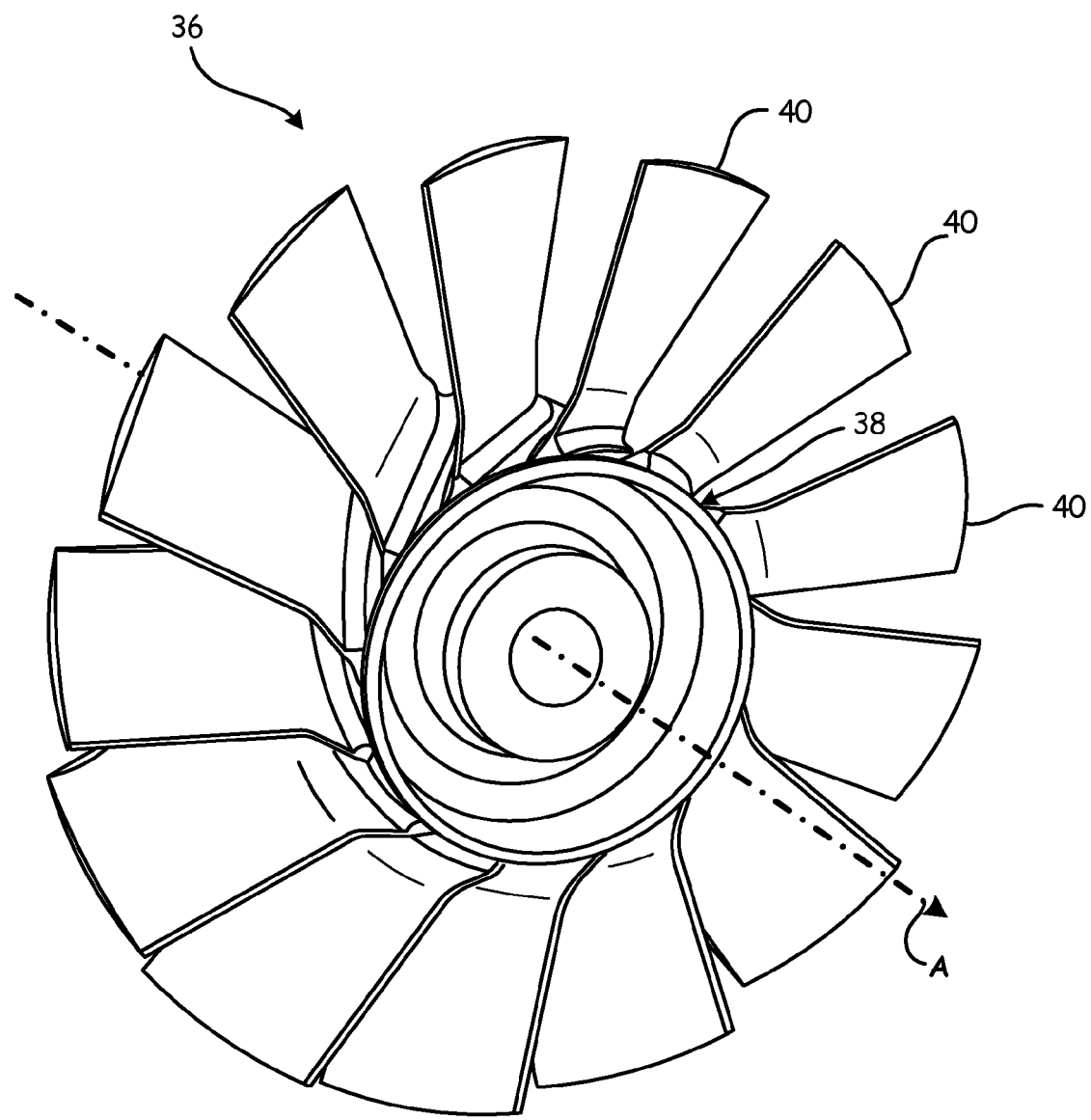
FIG. 2 is a perspective view of a fan rotor.

FIG. 2 shows a perspective view of fan rotor 36. Fan rotor 36 generally includes hub 38 with a plurality of fan blades 40. Fan blades 40 are attached to hub 38 along the base of fan blades 40. Fan blades 40 are even spaced around on an outer perimeter of hub 38 and extend radially outward from hub 38. During operation of ACM 20, shaft 30 spins causing fan rotor 36 to spin at a high rate. As fan rotor 36 spins, hub 38 and fan blades 40 maintain the same rate of rotation as fan rotor 36.

Due to the high rate of rotation of fan rotor 36, breakage of fan blades 40 can be a common failure event. In order to increase the structural strength of fan blades 40, the base portion of fan blades 40 near hub 38 is thickened to reduce the peak stress on the blade during operation conditions. Reducing the peak stressed experienced by fan blades 40 significantly improves the fatigue life of fan blades 40. However, increasing the thickness of fan blades 40 can create undesired effects on the aerodynamic characteristics of fan blade 40. To rectify the decrease in aerodynamic performance caused by increasing the thickness of fan blades 40, the chord length of the base of fan blades 40 is increased. (See chord length 48 shown in FIG. 4) The shape of fan blades 40 is ultimately designed to maximize aerodynamic performance of fan rotor 36. Fan blades 40 may be designed with computational fluid dynamics (CFD) analytical software and are optimized to meet the specific performance requirements of a specific ACM.

Figure 3:
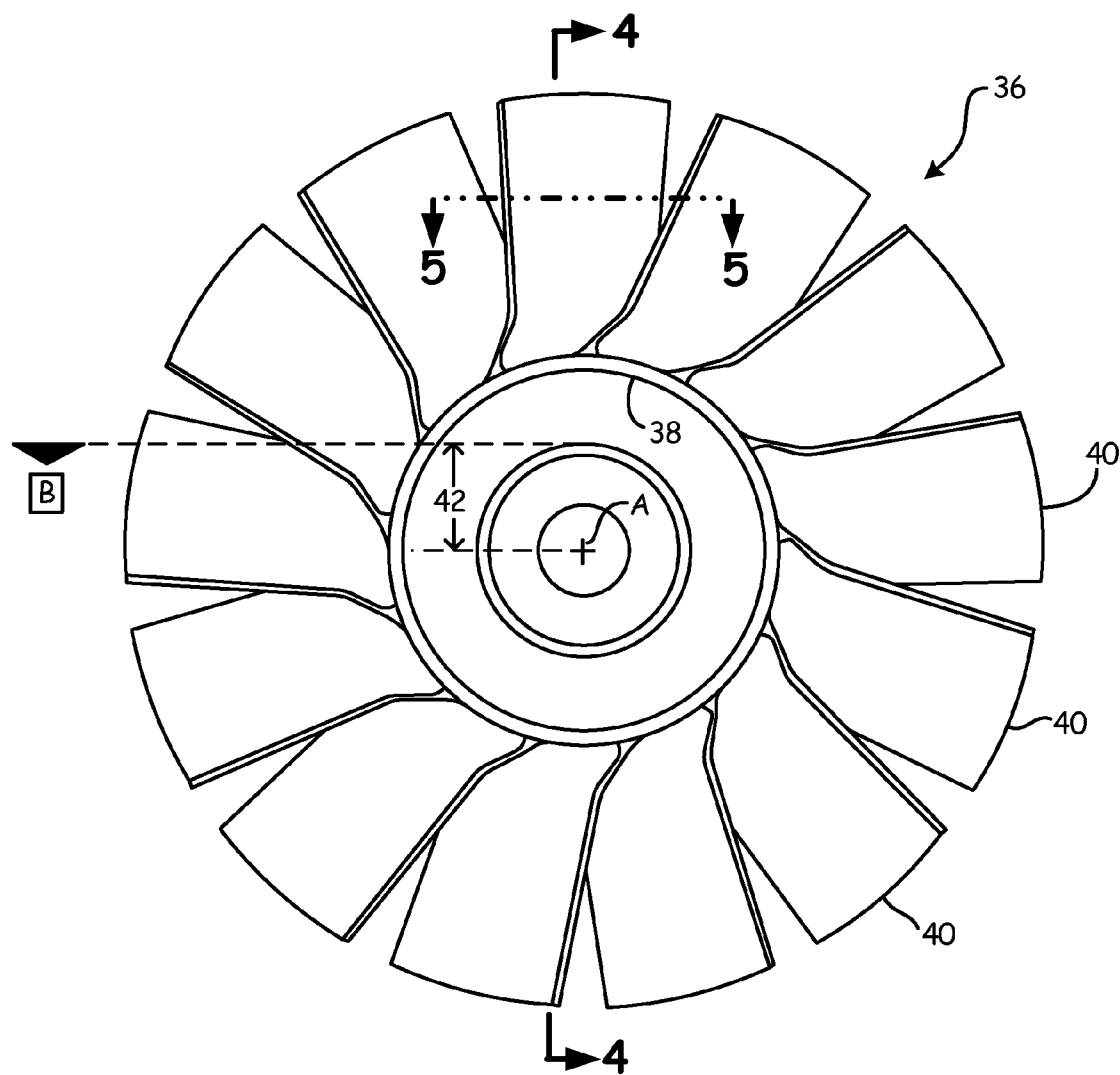
FIG. 3 is a front view of the fan rotor.

FIG. 3 shows a front view of fan rotor 36. Fan rotor 36 generally includes hub 38 with a plurality of fan blades 40. Fan blades 40 are attached to hub 38 along the base of fan blades 40. Fan blades 40 are evenly spaced around on an outer perimeter of hub 38 and extend radially outward from hub 38. Hub 38 includes a pilot radius 42. FIG. 3 also shows the location of Datum B. The value of Datum B can be used as a desired scaling factor in determining values for spatial characteristics of fan blades 40.

Figure 4:
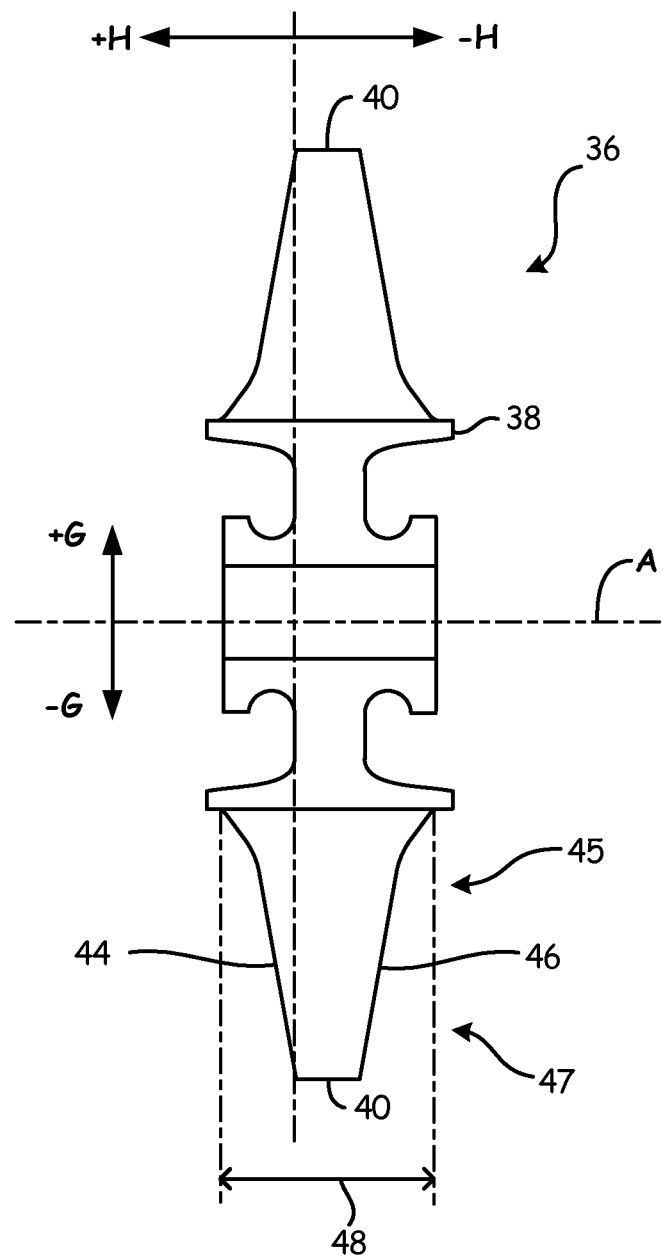
FIG. 4 is a sectional view of the fan rotor taken along line 4-4 in FIG. 3.

FIG. 4 shows a sectional view of fan rotor 36 taken along line 4-4 in FIG. 3. Fan rotor 36 includes fan blades 40 that extended radially outward from hub 38. Each of fan blades 40 includes leading edge 44 and trailing edge 46. Leading edge 44 extends in an upstream direction of ACM 20 and trailing edge 46 extends in a downstream direction of ACM 20. Each of fan blades 40 also includes base portion 45 and main airfoil portion 47. Base portion 45 is located adjacent to and radially outward from hub 38. Main airfoil portion 47 has a generally uniform thickness along its span. Relative to hub 38, main airfoil portion 47 is located at a distal end of each of fan blades 40. Base portion 45 is located between hub 38 and main airfoil portion 47. The length along base portion 45 is designated as chord length 48. Chord length 48 measures the length along base portion 45 from leading edge 44 to trailing edge 46.

With reference to FIG. 4, the tip contours of fan blades 40 are dimensionally defined herein by a paired axial dimension H and radial dimension G. The tip contour closely matches an adjacent fan shroud (not shown) with offset clearance to provide a desired fan rotor performance.

The paired dimensions H and G are provided in Table T-1 to define tip contours of leading edge 44 and trailing edge 46 of fan blades 40 along the span thereof. Characteristics of the shape may change from one to another and each may be directly scaled up or scaled down by a desired factor to meet different requirements.

The tip profiles of leading edge 44 and trailing edge 46 are disclosed in terms of the axial dimension H and the radial dimension G in the respective columns of Table T-1. The H and G coordinates are defined in a generally radial direction relative to the axis of Rotation A and as related to Datum B (shown in FIG. 3). The H coordinate values for determining the respective tip profile at the associated radial coordinate G in Table T-1 are provided as a ratio with respect to Datum B equaling a pilot radius. That is, the G coordinate values in Table T-1 herein represent a non-dimensionalized value equal to one (1) at Datum B. It should be understood that a variety of reference Data may alternatively or additionally be used.

The Table T1 values are provided in inches, and represent actual airfoil profiles at ambient, non-operating or non-hot conditions for an uncoated airfoil, the coatings for which are described below.

TABLE T-1

| Leading Edge | | Trailing Edge | |
|---|---|---|---|
| Ratio (G Rad/-B-) | H | Ratio (G Rad/-B-) | H |
| 1.9042 | −0.3238 | 1.9238 | 0.7562 |
| 1.9542 | −0.3221 | 1.9747 | 0.7558 |
| 2.0536 | −0.3159 | 2.0751 | 0.7483 |
| 2.1933 | −0.2866 | 2.1227 | 0.7384 |
| 2.2766 | −0.2561 | 2.1675 | 0.7252 |
| 2.3178 | −0.2405 | 2.2478 | 0.6909 |
| 2.3591 | −0.2250 | 2.3628 | 0.6358 |
| 2.4460 | −0.1978 | 2.4042 | 0.6196 |
| 2.5406 | −0.1802 | 2.4926 | 0.5921 |
| 2.5901 | −0.1762 | 2.5406 | 0.5831 |
| 2.6397 | −0.1723 | 2.5906 | 0.5780 |
| 2.7386 | −0.1645 | 2.6908 | 0.5681 |
| 3.1845 | −0.1292 | 3.1412 | 0.5236 |
| 3.4816 | −0.1057 | 3.6916 | 0.4695 |
| 3.7292 | −0.0862 | 3.8418 | 0.4548 |
| 3.8778 | −0.0745 | 4.0920 | 0.4302 |
| 4.1255 | −0.0549 | 4.1922 | 0.4204 |
| 4.3235 | −0.0393 | 4.2422 | 0.4156 |
| 4.4226 | −0.0315 | 4.3424 | 0.4058 |
| 4.4720 | −0.0276 | 4.4926 | 0.3912 |
| 4.5711 | −0.0198 | 4.6428 | 0.3767 |
| 4.6702 | −0.0120 | 4.7430 | 0.3670 |
| 4.7693 | −0.0042 | 4.7930 | 0.3622 |
| 4.8684 | −0.0036 | 4.8932 | 0.3525 |
| 4.9179 | 0.0075 | 4.9432 | 0.3476 |

Figure 5:
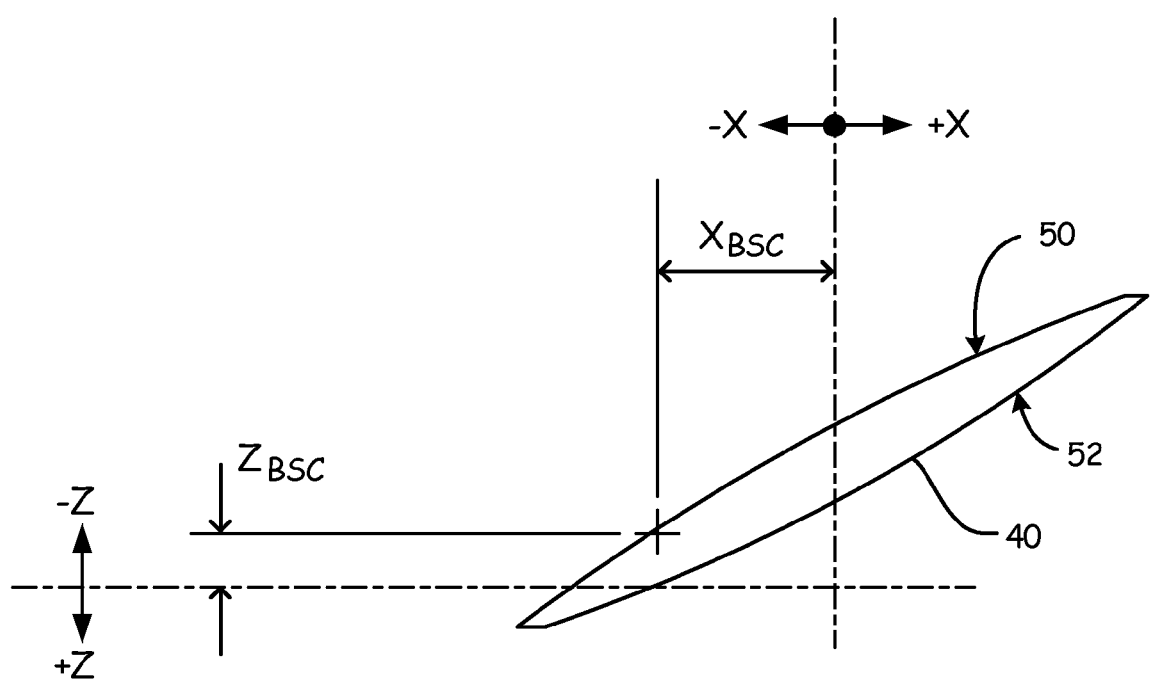
FIG. 5 is a sectional view of a fan blade taken along line 5-5 in FIG. 3.

FIG. 5 shows a sectional view of fan blade 40 taken along line 5-5 in FIG. 3. Fan blade 40 includes left surface 50 and right surface 52. The shape of fan blade 40 may be defined by a set of points in, for example, Cartesian coordinates which define a boundary thereof. Coordinates for one non-limiting dimensional embodiment are set forth in Table B-1 and Table B-2. Characteristics of the shape may change from one to another and each may be directly scaled up or scaled down by a desired factor to meet different requirements.

Table B-1 and Table B-2 are shown in a Cartesian coordinate system for X, Y and Z of the airfoil surface. The Cartesian coordinate system has orthogonally related X, Y and Z axes with the Y-axis extending generally in a radial direction relative to the axis of Rotation A and related with respect to Datum B. The X and Z coordinate values for determining the airfoil surface at each radial location are provided with respect to Y, wherein Y coordinate values in Table B-1 and Table B-2 disclosed herein represent a non-dimensionalized value equal to one (1) at pilot radius 42. That is, the disclosed, non-dimensionalized value Y in Table B-1 and Table B-2 is provided as a ratio with respect to Datum B equal to pilot radius 42. It should be understood that a variety of reference Data may alternatively or additionally be used.

By defining X and Z coordinate values at selected locations in the radial direction, i.e., in a Y direction with respect to Datum B, the left and right surfaces of the airfoil are ascertained. By connecting the X and Z values with smooth continuing arcs, each profile surface at the associated radial distance Y is defined. The surface profiles at the various radial locations between the radial distances Y are thereby ascertained by connecting adjacent surface profiles. Although the X, Y, and Z axes are oriented in the above fashion, it should be appreciated that the X, Y, and Z axes may have any orientation provided that the axes are orthogonally oriented with respect to each other and one axis extends along a height or span of the blade.

Table B-1 and Table B-2 values are provided in inches, and represent actual airfoil profiles at ambient, non-operating or non-hot conditions for an uncoated airfoil, the coatings for which are described below.

TABLE B-1

Fan Blade Right Surface

| X BSC | Ratio (Y BSC/-B-) | Z BSC |
|---|---|---|
| 0.4300 | 4.6626 | −0.3309 |
| 0.2155 | 4.7115 | −0.2249 |
| 0.0151 | 4.7277 | −0.1417 |
| −0.2236 | 4.7102 | −0.0593 |
| −0.4118 | 4.6681 | −0.0047 |
| −0.3960 | 4.1198 | 0.0349 |
| −0.1714 | 4.1706 | −0.0490 |
| 0.0004 | 4.1822 | −0.1278 |
| 0.1780 | 4.1697 | −0.2244 |
| 0.4077 | 4.1160 | −0.3763 |
| 0.4027 | 3.5621 | −0.4394 |
| 0.1557 | 3.6256 | −0.2238 |
| −0.0600 | 3.6351 | −0.0804 |
| −0.2381 | 3.6109 | 0.0135 |
| −0.4021 | 3.5625 | 0.0836 |
| −0.3716 | 3.0165 | 0.1192 |
| −0.2216 | 3.0648 | 0.0426 |
| −0.0145 | 3.0910 | −0.0923 |
| 0.1761 | 3.0741 | −0.2551 |
| 0.3622 | 3.0203 | −0.4670 |
| 0.3495 | 2.7084 | −0.4924 |
| 0.1515 | 2.7684 | −0.2367 |
| −0.0077 | 2.7821 | −0.0874 |
| −0.2221 | 2.7526 | 0.0654 |
| −0.3862 | 2.6921 | 0.1546 |
| −0.3186 | 2.4790 | 0.1439 |
| −0.1559 | 2.5299 | 0.0415 |
| −0.0091 | 2.5457 | −0.0745 |
| 0.1702 | 2.5268 | −0.2591 |
| 0.3207 | 2.4780 | −0.4740 |
| 0.3489 | 2.2015 | −0.5431 |
| 0.2039 | 2.2609 | −0.2909 |
| −0.0388 | 2.2900 | −0.0206 |
| −0.2646 | 2.2400 | 0.1489 |
| −0.3788 | 2.1851 | 0.2155 |

TABLE B-2

Fan Blade Left Surface

| X BSC | Ratio (Y BSC/-B-) | Z BSC |
|---|---|---|
| −0.4358 | 4.6608 | −0.0234 |
| −0.2476 | 4.7062 | −0.1239 |
| −0.0167 | 4.7275 | −0.2249 |
| 0.2251 | 4.7099 | −0.3067 |
| 0.4091 | 4.6688 | −0.3553 |
| 0.3782 | 4.1253 | −0.3988 |
| 0.2455 | 4.1584 | −0.3469 |

TABLE B-2-continued

Fan Blade Left Surface

| X BSC | Ratio (Y BSC/-B-) | Z BSC |
|---|---|---|
| −0.0213 | 4.1820 | −0.2244 |
| −0.2178 | 4.1635 | −0.1163 |
| −0.4199 | 4.1120 | 0.0136 |
| −0.4135 | 3.5581 | 0.0586 |
| −0.1956 | 3.6192 | −0.1086 |
| −0.0255 | 3.6363 | −0.2238 |
| 0.1854 | 3.6211 | −0.3523 |
| 0.3617 | 3.5767 | −0.4484 |
| 0.3245 | 3.0343 | −0.4876 |
| 0.1319 | 3.0819 | −0.3486 |
| −0.1102 | 3.0846 | −0.1584 |
| −0.2810 | 3.0486 | −0.0113 |
| −0.3919 | 3.0079 | 0.0916 |
| −0.3948 | 2.6879 | 0.1253 |
| −0.2644 | 2.7402 | −0.0069 |
| −0.0634 | 2.7797 | −0.1956 |
| 0.1430 | 2.7699 | −0.3758 |
| 0.3301 | 2.7166 | −0.5303 |
| 0.2837 | 2.4928 | −0.5240 |
| 0.0750 | 2.5420 | −0.3316 |
| −0.1508 | 2.5310 | −0.1118 |
| −0.2686 | 2.4984 | 0.0098 |
| −0.3832 | 2.4484 | 0.1343 |
| −0.4018 | 2.1715 | 0.1668 |
| −0.2565 | 2.2431 | −0.0043 |
| −0.0850 | 2.2858 | −0.1938 |
| 0.1393 | 2.2771 | −0.4282 |
| 0.3224 | 2.2149 | −0.6141 |

As the aforementioned airfoils heat up during operation, applied stresses and temperatures induced to the airfoils may inevitably cause some deformation of the airfoil shape, and hence there is some change or displacement in the Table coordinate values. While it is not possible to measure the changes in the Table coordinate values in operation, it has been determined that the Table coordinate values plus the deformation in use, enables efficient, safe and smooth operation.

It is appreciated that the Table coordinate values may be scaled up or down geometrically in order to be introduced into other similar machine designs. It is therefore contemplated that a scaled version of the Table coordinate values set forth may be obtained by multiplying or dividing each of the Table coordinate values by a predetermined constant N. It should be appreciated that the Table coordinate values could be considered a scaled profile with N set equal to 1, and greater or lesser dimensioned components are obtained by adjusting N to values greater and lesser than 1, respectively.

The Table coordinate values are computer-generated and disclosed to four decimal places. However, in view of manufacturing constraints, actual values useful for manufacture of the component are considered to be the values to determine the claimed profile. There are, for example, typical manufacturing tolerances which must be accounted for in the profile. Accordingly, the Table coordinate values are for a nominal airfoil. It will therefore be appreciated that plus or minus typical manufacturing tolerances are applicable to these Table coordinate values and that an airfoil having a profile substantially in accordance with those values includes such tolerances. For example, a manufacturing tolerance of about plus or minus 0.030 inches normal to the blade surface should be considered within design limits for the airfoil. Thus, the mechanical and aerodynamic function of the airfoils is not impaired by manufacturing imperfections and tolerances, which in different embodiments may be greater or lesser than the values set forth above. As appreciated by those in the art, manufacturing tolerances may be determined to achieve a desired mean and standard deviation of manufactured airfoils in relation to the ideal airfoil profile points set forth in the Tables.

In addition, the component may also be coated for protection against corrosion and oxidation after the component is manufactured, according to the values of the Tables and within the tolerances explained above. Consequently, in addition to the manufacturing tolerances for Table coordinate values, there may also be an addition to account for the coating thicknesses. It is contemplated that greater or lesser coating thickness values may be employed in alternative embodiments of the invention. Consequently, in addition to the manufacturing tolerances, there is also a modification to the Table coordinate values to account for the coating thicknesses. It is contemplated that greater or lesser coating thickness values may be employed in alternative embodiments of the invention.

DISCUSSION OF POSSIBLE EMBODIMENTS

The following are non-exclusive descriptions of possible embodiments of the present invention.

A fan rotor of an air cycle machine may include a plurality of fan blades extending from a hub. Each of the plurality of fan blades may include a main airfoil portion located distally from the hub. The main airfoil portion may have a generally uniform thickness along its span. A base portion of each of the plurality of fan blades may be located between the hub and the main airfoil portion. The base portion may have a chord length that is longer than a chord length of the main airfoil portion.

The fan rotor of the preceding paragraph can optionally include, additionally and/or alternatively, any one or more of the following features, configurations, and/or additional components.

The plurality of fan blades may be defined by a set of X-coordinates, Y-coordinates, and Z-coordinates set out in any of Table B-1 or Table B-2. The X-coordinates, Y-coordinates, and Z-coordinates may be scaled by a desired factor. The X-coordinates may be in the axial direction, the Y-coordinates may be in the radial direction, and the Z-coordinates may be in the tangential direction.

The plurality of fan blades may include a leading edge tip contour and a trailing edge tip contour defined by a set of points as defined in Table T-1 scaled to the desired factor. The set of points may include paired axial dimensions H from a reference surface and radial dimensions G from a center line of the fan rotor.

The surfaces defined by Table B-1, Table B-2, and Table T-1 may be adjusted by a manufacturing tolerance.

The manufacturing tolerance may be about plus or minus 0.030 inches (0.76 mm).

The plurality of fan blades may include a substantially uniform width between the first and second surfaces.

The desired factor for scaling may be equal to or greater than 1.

The desired factor for scaling may be less than 1.

Alternatively, a fan rotor of an air cycle machine may include a plurality of fan blades extending from a hub. The plurality of fan blades may be defined by a set of X-coordinates, Y-coordinates, and Z-coordinates set out in any of Table B-1 or Table B-2. The X-coordinates, Y-coordinates, and Z-coordinates may be scaled by a desired factor. The X-coordinates may be in the axial direction, the Y-coordinates may be in the radial direction, and the Z-coordinates may be in the tangential direction.

The fan rotor of the preceding paragraph can optionally include, additionally and/or alternatively, any one or more of the following features, configurations, and/or additional components.

The plurality of fan blades may include a leading edge tip contour and a trailing edge tip contour defined by a set of points as defined in Table T-1 scaled to the desired factor. The set of points may include paired axial dimensions H from a reference surface and radial dimensions G from a center line of the fan rotor.

The surfaces defined by Table B-1, Table B-2, and Table T-1 may be adjusted by a manufacturing tolerance of about plus or minus 0.030 inches (0.76 mm).

The desired factor for scaling may be equal to or greater than 1.

The desired factor for scaling may be less than 1.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fan rotor for an air cycle machine, the fan rotor comprising:
    a hub; and
    a plurality of fan blades extending from the hub, each of the plurality of fan blades with a left and right surface, wherein the plurality of fan blades are defined by a set of X-coordinates, Y-coordinates, and Z-coordinates set out in any of Table B-1 or Table B-2 scaled by a desired factor, the X-coordinates being in the axial direction, the Y-coordinates being in the radial direction, and the Z-coordinates being in the tangential direction, each fan blade including:
        a main airfoil portion located distally from the hub, the main airfoil portion having a generally uniform thickness along its span, and
        a base portion located between the hub and the main airfoil portion of each of the fan blade, the base portion having a chord length that is longer than a chord length of the main airfoil portion.

2. The fan rotor as recited in claim 1, wherein the plurality of fan blades include a leading edge tip contour and a trailing edge tip contour defined by a set of points as defined in Table T-1 scaled to the desired factor, the set of points including paired axial dimensions H from a reference surface and radial dimensions G from a center line of the fan rotor.

3. The fan rotor as recited in claim 2, wherein each of the surfaces defined by Table B-1, Table B-2, and Table T-1 are adjusted by a manufacturing tolerance.

4. The fan rotor as recited in claim 3, wherein the manufacturing tolerance is plus or minus 0.030 inches (0.76 mm).

5. The fan rotor as recited in claim 2, wherein the desired factor for scaling is equal to or greater than 1.

6. The fan rotor as recited in claim 2, wherein the desired factor for scaling is less than claim 1.

7. The fan rotor as recited in claim 1, wherein each of the plurality of fan blades include a substantially uniform width between the left and right surfaces.

8. A fan rotor for an air cycle machine, the fan rotor comprising:
    a hub; and
    a plurality of fan blades extending from the hub, wherein each of the plurality of fan blades defined by a set of X-coordinates, Y-coordinates, and Z-coordinates set out in any of Table B-1 or Table B-2 scaled by a desired factor, the X-coordinates being in the axial direction, the Y-coordinates being in the radial direction, and the Z-coordinates being in the tangential direction.

9. The fan rotor as recited in claim 8, wherein the plurality of fan blades include a leading edge tip contour and a trailing edge tip contour defined by a set of points as defined in Table T-1 scaled to the desired factor, the set of points including paired axial dimensions H from a reference surface and radial dimensions G from a center line of the fan rotor.

10. The fan rotor as recited in claim 9, wherein each of the surfaces defined by Table B-1, Table B-2, and Table T-1 are adjusted by a manufacturing tolerance of plus or minus 0.030 inches (0.76 mm).

11. The fan rotor as recited in claim 10, wherein the desired factor for scaling is less than claim 1.

12. The fan rotor as recited in claim 9, wherein the desired factor for scaling is equal to or greater than 1.

* * * * *